(12) United States Patent
Casey

(10) Patent No.: US 11,718,436 B2
(45) Date of Patent: Aug. 8, 2023

(54) PRODUCT AND METHOD FOR ADHERING INDICIA TO A FLEXIBLE SUBSTRATE

(71) Applicant: Carol Diane Casey, Dearborn, MI (US)

(72) Inventor: Carol Diane Casey, Dearborn, MI (US)

(*) Notice: Subject to any disclaimer, the term of this patent is extended or adjusted under 35 U.S.C. 154(b) by 407 days.

(21) Appl. No.: 16/890,512

(22) Filed: Jun. 2, 2020

(65) Prior Publication Data

US 2021/0139183 A1 May 13, 2021

Related U.S. Application Data

(63) Continuation-in-part of application No. 16/682,632, filed on Nov. 13, 2019, now abandoned.

(51) Int. Cl.

| | | |
|---|---|---|
| *G09F 3/02* | (2006.01) |
| *B65C 3/02* | (2006.01) |
| *B65C 5/02* | (2006.01) |
| *G09F 3/00* | (2006.01) |
| *C09J 7/21* | (2018.01) |
| *G09F 3/10* | (2006.01) |
| *B29C 65/00* | (2006.01) |
| *B63B 34/50* | (2020.01) |

(52) U.S. Cl.
CPC ............... *B65C 3/02* (2013.01); *B65C 5/02* (2013.01); *C09J 7/21* (2018.01); *G09F 3/0295* (2013.01); *G09F 3/10* (2013.01); *B29C 66/00* (2013.01); *B63B 34/50* (2020.02); *C09J 2203/334* (2013.01); *G09F 2003/0208* (2013.01)

(58) Field of Classification Search
CPC .. B65C 3/02; B65C 5/02; G09F 3/0295; G09F 3/10; G09F 2003/0208; B63B 34/50
See application file for complete search history.

(56) References Cited

U.S. PATENT DOCUMENTS

| | | |
|---|---|---|
| 3,931,656 A | 1/1976 | Thomson |
| 4,133,604 A | 1/1979 | Fuller |
| 4,861,300 A | 8/1989 | Casagrande et al. |
| 5,015,085 A | 5/1991 | May |
| 5,019,000 A | 5/1991 | Stephens |

(Continued)

FOREIGN PATENT DOCUMENTS

| | | |
|---|---|---|
| CN | 1133971 | 1/2004 |
| CN | 304384678 | 12/2017 |

(Continued)

OTHER PUBLICATIONS

Waterproof Camera Float, https://www.amazon.com/Waterproof-Camera-Float-Strap-Underwater/dp/B00YR8ZNDU. (Year: 2023).*

(Continued)

*Primary Examiner* — Gary C Hoge
(74) *Attorney, Agent, or Firm* — Brooks Kushman P.C.

(57) ABSTRACT

A method for adhering a label, lettering, ink, a tattoo, sketch, design or color ("indicia") to a substrate comprising the steps of: providing an indicia-bearing backing paper; moistening the indicia-bearing backing paper to form a moistened indicia-bearing layer; providing an adhesive layer between the moistened indicia-bearing layer and the substrate; placing the moistened indicia-bearing layer on the adhesive layer; allowing the indicia to become separated from the backing paper, leaving the indicia upon the substrate; and drying on the substrate.

18 Claims, 4 Drawing Sheets

(56) References Cited

U.S. PATENT DOCUMENTS

| | | | |
|---|---|---|---|
| 5,074,656 A | 12/1991 | Parrish | |
| 5,098,772 A | 3/1992 | Af Strom | |
| 5,235,355 A | 8/1993 | May | |
| 5,351,346 A | 10/1994 | Hodges, Jr. | |
| 5,427,259 A | 6/1995 | Krastanov | |
| D368,758 S | 4/1996 | May | |
| D372,756 S | 8/1996 | May | |
| 5,578,353 A * | 11/1996 | Drew, III | B44C 1/175 446/296 |
| 5,600,873 A | 2/1997 | May | |
| 5,637,172 A | 6/1997 | Kerr | |
| 5,928,797 A * | 7/1999 | Vineberg | B44D 3/00 401/196 |
| 6,161,314 A | 12/2000 | Kamrin | |
| 6,182,169 B1 | 1/2001 | Force, Sr. et al. | |
| D438,373 S | 3/2001 | Riley | |
| 6,322,876 B1 | 11/2001 | Lythgoe et al. | |
| 6,332,819 B1 | 12/2001 | Emmons | |
| 6,345,747 B1 | 2/2002 | Ogata et al. | |
| 6,425,167 B1 | 7/2002 | Barbarite et al. | |
| 6,471,560 B2 | 10/2002 | Kerckhoff | |
| 6,726,516 B2 | 4/2004 | Sowry et al. | |
| 6,752,305 B2 | 6/2004 | Shattuck | |
| 7,020,935 B2 | 4/2006 | Behn et al. | |
| 7,090,740 B2 | 8/2006 | Dronzek | |
| 7,131,167 B2 | 11/2006 | Stagnaro | |
| 7,264,525 B2 | 9/2007 | Tsitas | |
| 7,267,509 B1 | 9/2007 | Jackson, III | |
| 7,762,860 B2 | 7/2010 | Reed | |
| 7,922,049 B2 | 4/2011 | Wu et al. | |
| D677,842 S | 3/2013 | Kalbach | |
| D679,218 S | 4/2013 | Kalbach | |
| D681,504 S | 5/2013 | Kalbach | |
| D699,144 S | 2/2014 | Kalbach | |
| 8,888,545 B2 | 11/2014 | Rossini | |
| 8,961,250 B2 | 2/2015 | Meyer | |
| D723,795 S | 3/2015 | Kalbach | |
| 9,022,825 B1 | 5/2015 | Meyer | |
| 9,164,543 B2 | 10/2015 | Minn et al. | |
| 9,278,734 B2 | 3/2016 | Pennington | |
| 9,426,560 B2 | 8/2016 | Wilson, II et al. | |
| 9,605,696 B1 | 3/2017 | May | |
| D785,928 S | 5/2017 | Akana et al. | |
| 9,770,367 B2 | 9/2017 | Andersen et al. | |
| D800,447 S | 10/2017 | Akana et al. | |
| D866,954 S | 11/2019 | Wood et al. | |
| 2006/0058080 A1 | 3/2006 | Chen | |
| 2006/0124676 A1 | 6/2006 | Mastrosimone | |
| 2007/0215663 A1 | 9/2007 | Chongson et al. | |
| 2007/0235493 A1 | 10/2007 | Fortson | |
| 2007/0277352 A1 | 12/2007 | Maron et al. | |
| 2008/0220195 A1 * | 9/2008 | Henshaw | G09F 21/02 427/208.8 |
| 2009/0093177 A1 | 4/2009 | Reed | |
| 2010/0080087 A1 | 4/2010 | Shupp | |
| 2010/0133306 A1 | 6/2010 | Monroe | |
| 2011/0036879 A1 | 2/2011 | Calayo et al. | |
| 2011/0226823 A1 | 9/2011 | Jasa | |
| 2012/0080469 A1 | 4/2012 | Souders | |
| 2012/0091176 A1 | 4/2012 | Samuel | |
| 2012/0273541 A1 | 11/2012 | Zwach | |
| 2013/0306692 A1 | 11/2013 | Mangum et al. | |
| 2016/0037898 A1 | 2/2016 | Minn et al. | |
| 2016/0094262 A1 | 3/2016 | Chorny | |
| 2017/0081561 A1 * | 3/2017 | Costantino | G06F 16/9554 |
| 2018/0177284 A1 | 6/2018 | Zagorski | |
| 2019/0176942 A1 | 6/2019 | Sun | |
| 2019/0176943 A1 | 6/2019 | Sun | |
| 2019/0328119 A1 | 10/2019 | Burnet et al. | |
| 2020/0153954 A1 | 5/2020 | Phillips | |

FOREIGN PATENT DOCUMENTS

| | | |
|---|---|---|
| JP | 2002097001 A | 1/2005 |
| WO | 1989009689 | 10/1989 |
| WO | 1997/042040 | 11/1997 |

OTHER PUBLICATIONS

Website: Industrial Uses of Pool Noodles, https//www.alcotplastics.com/industrial-uses-of-pool-noodles/blog.html, ALCOT Plastics Ltd., Sep. 24, 2019, 2 pgs.

Video entitled DIV Pool Noodle Wreath Form, available at, https//www youtube.com/watch?v=IJcGUHiDIZI, Thiscraftylife, 4 pgs.

* cited by examiner

PRODUCT AND METHOD FOR ADHERING INDICIA TO A FLEXIBLE SUBSTRATE

CROSS-REFERENCE TO RELATED APPLICATIONS

This application is a continuation-in-part of U.S. application Ser. No. 16/682,632 filed Nov. 13, 2019, now abandoned, the disclosure of which is incorporated in its entirety by reference.

TECHNICAL FIELD

Several aspects of this disclosure relate to labelling, or the application of indicia such as lettering, images, decals and tattoos to buoyant, flexible substrates and to products made thereby.

BACKGROUND

In a marine environment, a flotation device refers to a life jacket, life preserver, life belt, Mae West, life vest. life saver, cork jacket, buoyancy aid or flotation suit. Such products are designed to help a sinkable object or wearer to stay afloat in water. Flotation devices such as a foam noodle or foam core are used to provide buoyancy to a person or object to help keep the person or object afloat. Collectively, herein such products are termed "a substrate" or "substrates". Often, they are made of a foam polyethylene material, which is a relatively strong and resilient closed cell foam that provides excellent buoyancy.

A conventional way to label, decorate and personalize polyethylene products involves covering the polyethylene substrate with fabric or thin layer of plastic wrap to which an ink has been applied. Such coverings bear the messaging indicia, and not the substrate itself.

One problem with conventional approaches to labelling relates to the relative impermanence of the plastic wrap or film because it tends readily to delaminate from the substrate to which it is applied. Thus, especially after prolonged use, the observer is unable to clearly discern what message is being communicated visually by the plastic wrap. Delamination or image fading or discoloration may exacerbate the problem. Relatedly, concerns about disposal and trash handling may arise.

Non-porous polymeric substrates present challenges to labelling because an adhesive is unable to penetrate the substrate. Another difficulty is that some labels may be prone to moving from a desired location during the application or drying steps.

In the labelling industry, it is known that use of for example paper labels may be disadvantageous because of wrinkling, tearing and creasing, in part due to age and moisture. Further, problems of separation may occur when labels are applied to a bendable substrate.

It would therefore be desirable to provide substrate labelling or decoration techniques and long-lasting indicia film-bearing substrates to overcome such problems.

It would also be desirable to provide a labelling process that is useful in applying indicia to a polymeric foam substrate and adhere with sufficient strength without the indicia becoming re-positioned during post-labelling handling and conveying.

Some art considered before filing this patent application included WO 8909689-A1; JP 5871820-B2; CN 106174445-A; and U.S. Pat. No. 7,090,740.

SUMMARY

Several aspects of this disclosure relate to a product and method for making a label, decal, tattoo or the like (collectively "indicia") that remain affixed to a flexible substrate, such as a polyethylene foam for decoration or messaging. As the substrate bends, the indicia remain adhered, even in a wet environment, over time and despite frequent bending. In this context "indicia" refers to ink, lettering, a drawing or sketch and to the assembly of such with a clear plastic film or backing paper.

To meet acceptability criteria, the labelled substrate product is preferably made by following certain method steps, is resistant to water, and is unaffected by normal outdoor temperatures (20-120 degrees F.).

One substrate material is polyethylene, which is a petroleum-based product. Desirably, the ink, or paint components of the indicia must adhere to this material, thus imbuing the resulting product with a label that stays sharp, does not tarnish and retains a fresh appearance, while remaining flexible.

The disclosed process addresses performance concerns and economic challenges presented by prior process steps and materials. By following the steps disclosed herein, suitable indicia can be applied to a substrate using a preferably water-based adhesive composition.

DETAILED DESCRIPTION

As required, detailed variations of the present invention are disclosed herein. However, it is to be understood that the disclosed variations are merely exemplary of the invention that may be embodied in various and alternative forms. The Figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present invention.

This disclosure relates to a method for applying indicia such as decals and decorations to a material such as polyethylene foam that is not readily emblazoned by conventional means.

Such indicia can personalize for example objects made from polyethylene. Illustrative non-limiting items are toys such as swimming pool foam noodles and boogie boards, theatrical props, costume pieces, accessories, military and first responder vests and moveable armor.

Figure 1:
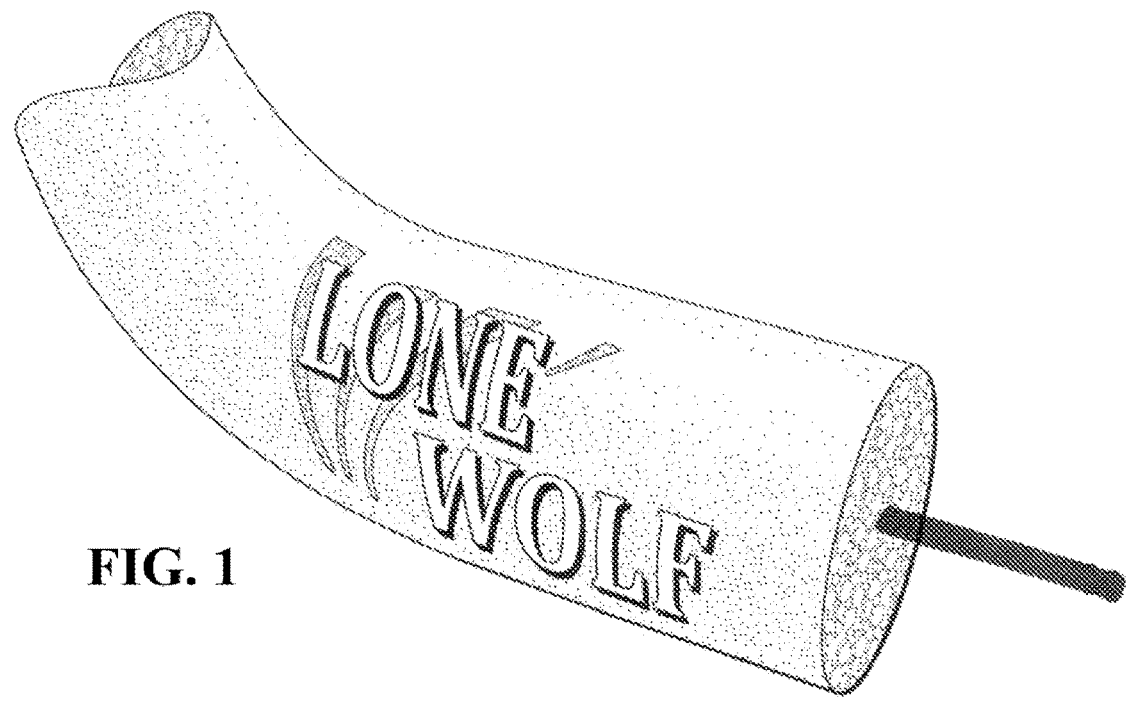
FIG. 1 is a representative perspective view of a portion of a foam substrate to which indicia (e.g., "Lone Wolf") adhere.

FIG. 1 is a perspective view of a flexible foam polyethylene substrate that represents several Variations of the invention. Noteworthy is that there are indicia (e.g., "Lone Wolf") that have been applied to the foam substrate. The indicia remain adhered to the substrate surface even when the flexible substrate is bent repeatedly and has been exposed to a moist or wet environment.

Figure 2:
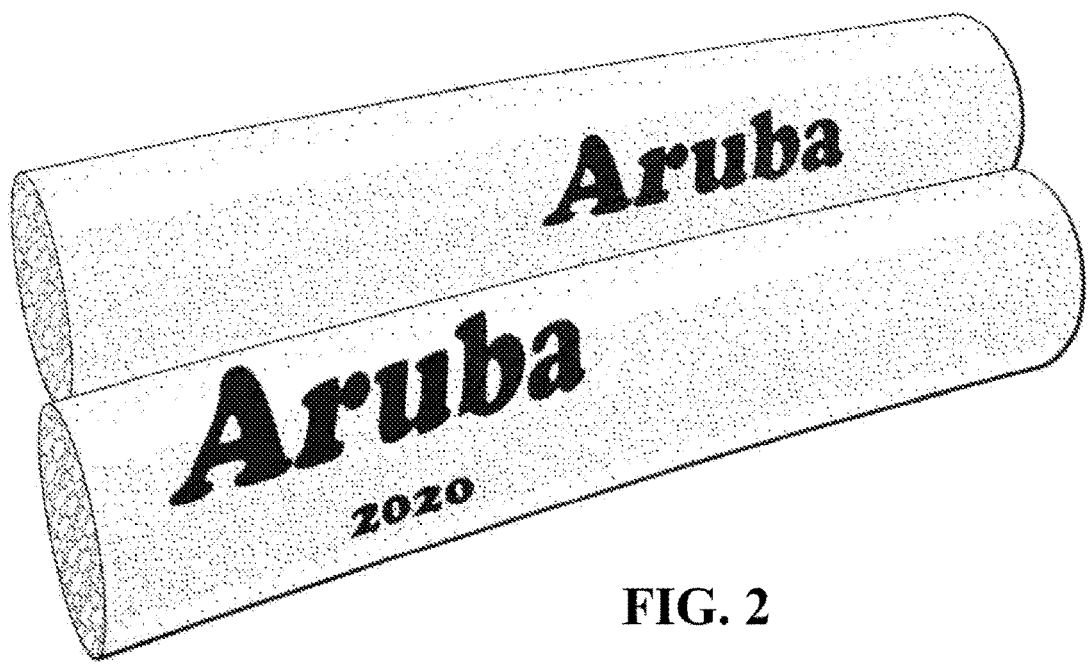
FIG. 2 illustrates a perspective view of two substrate ends that are juxtaposed.

FIG. 2 illustrates a product configuration in which the ends of the flexible substrate are bent backwards so that the ends meet. Again, indicia (e.g., "Aruba") are presented to an observer.

The "indicia" (defined earlier) indicia may be offered in strip- or sheet-form. In some variants, a temporary tattoo performed satisfactorily. Preferably, temporary tattoos are made from skin-safe materials.

Figure 3:
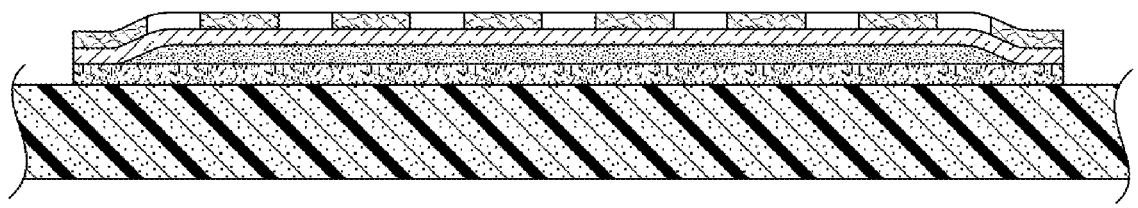
FIG. 3 is a radial cross-sectional view through part of a foam substrate to which an adhesive layer, an ink layer, a clear film layer and a backing paper have been applied (Variation #1)

To make Variation #1 (FIG. 3), the backing or white paper first lies atop the clear film layer. Inked indicia lie on the underside of the clear film layer. The ink-bearing transparent plastic film is affixed to the substrate by an adhesive layer. In this Variation, the backing paper is associated with the indicia. The backing or white paper is removed after a wetting or moistening step, to be described later. Then, the paper is discarded after the indicia are applied to the substrate. This allows the ink of the indicia to show through the clear film layer.

Below the paper layer, the clear film covers ink ("indicia-bearing film") that is printed thereupon. In several applications, the film is cut so that it extends beyond the ink area.

Below the ink layer is an adhesive that bonds the ink to the substrate and creates a seal over and around the ink.

Preferably, the adhesive is activated so that it sticks to the substrate after a wetting or moistening step using a moisture-bearing medium such as a sponge. The wetting step releases the paper layer and leaves the film, ink and adhesive on the indicia-bearing polyethylene foam substrate. Subsequently, the adhesive dries after the paper is removed.

Figure 4:
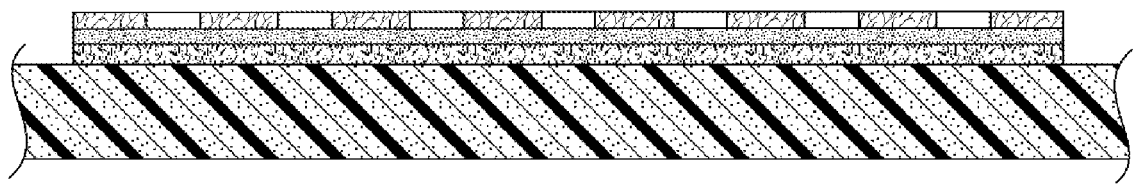
FIG. 4 is a radial cross-sectional view through part of a foam substrate that supports an adhesive layer, an ink layer and a backing paper (Variation #2)

FIG. 4 (Variation #2) illustrates a preferred Variation. It lacks a clear plastic film over the indicia. A backing or white paper layer overlies an ink or indicia layer. The paper is removed after a wetting step and discarded after the indicia are applied to the substrate. This allows the ink to be seen on top of the substrate. In this approach, ink is printed directly onto the backing paper. The backing paper can be the same size or larger than the ink area. The adhesive lies below the ink.

The adhesive is activated to stick to the substrate by the wetting step. The wetting step releases the paper layer, leaving the adhesive and ink on the substrate. The adhesive and ink dry soon after the paper is removed. Then, the indicia can only be scratched off with robust effort.

In the preferred practice (Variation #2), an extra layer (clear plastic film) is eliminated.

Preferably, the indicia have a coefficient of expansion or contraction that is compatible with that of the substrate so that expansion or contraction or deformation of the substrate will not wrinkle or otherwise affect the integrity of the indicia.

Figure 5:
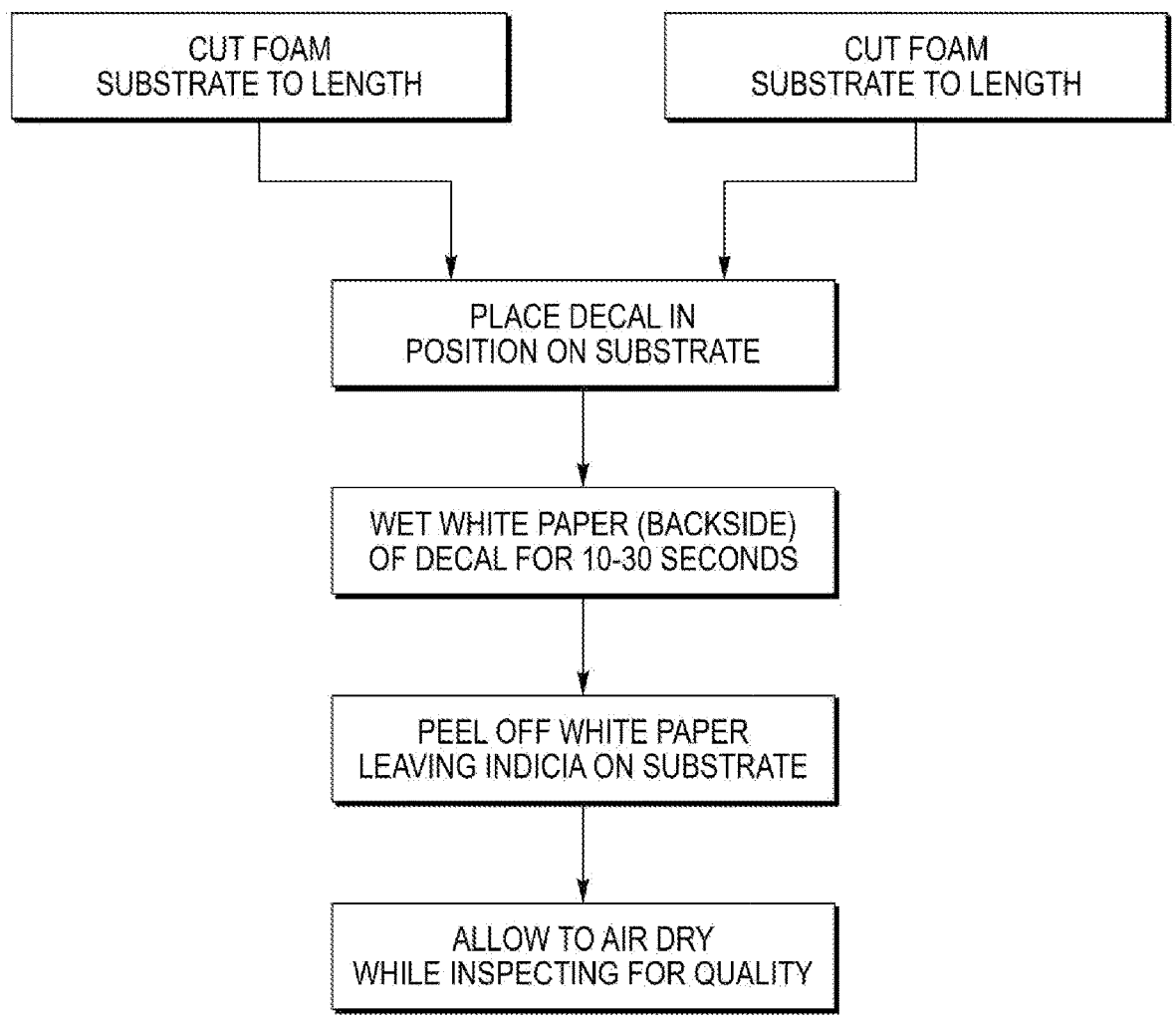
FIG. 5 is a representative flowchart depicting some of the steps involved in substrate preparation and indicia or decal preparation, including positioning, wetting or moistening, stripping and drying steps.

FIG. 5 is a representative process flow diagram to make Variation #1. A cylindrical portion of the foam substrate is first cut to a desired length. A suitable length may be about 12-14 inches and have a diameter of about 1 inch. To prepare the indicia for affixation to the substrate, the clear plastic film which bears the indicia is separated from the backing paper. That clear plastic film layer includes indicia such as lettering, a message, a decal or a tattoo which is to be affixed to the substrate.

If desired, the clear plastic film can be stretched before application to the substrate. Such a step may tend to avoid creasing the clear plastic film, while improving adhesion and peel-resistance between the indicia and the substrate.

Next, the indicia are placed in position on the substrate. Then, the backing paper or back side of the indicia/decal is wetted for about 10 to 30 seconds. One way to do this is to at least partially saturate the backing paper with a wetted medium or sponge. Preferably the cylindrical substrate is rolled about its longitudinal axis in relation to the wetted sponge. When the backing paper becomes wet, it becomes translucent. Then, the backing paper is peeled off. This leaves the indicia in place on the foam substrate.

In some cases, the sausage-shaped foam substrate includes a longitudinally extending filament or string that runs axially therethrough If desired, the elongated, sausage-shaped flexible substrate is then is then bent so that its ends are brought together (FIG. 2). Portions of that filament which extend from the substrate ends can be used for example to tether to a connector which secures an iPhone, as disclosed in U.S. application Ser. No. 16/682,632 filed Nov. 13, 2019. If the iPhone is dropped in the water, buoyancy of the substrate causes the iPhone to rise to the surface.

Finally, the assembly is allowed to air dry, preferably while inspecting for quality.

The indicia for messaging or decoration applied to a substrate following the methodology described above can be scrubbed off only by using fairly harsh measures, for example by using rubbing alcohol or baby oil. But in normal use, the indicia adhere to the substrate satisfactorily.

Thus, the approaches described herein provide a labelling technique that can be used satisfactorily on a polymeric foam substrate such that the combination of indicia and substrate have compatible moduli of elasticity and flexibility. As a result, the label is not degraded by handling and bending of the substrate. Further, from an environmental viewpoint, the process disclosed herein results in a label-substrate combination in which the label does not need to be removed from the substrate in order to re-grind or recycle defective products.

Figure 6:
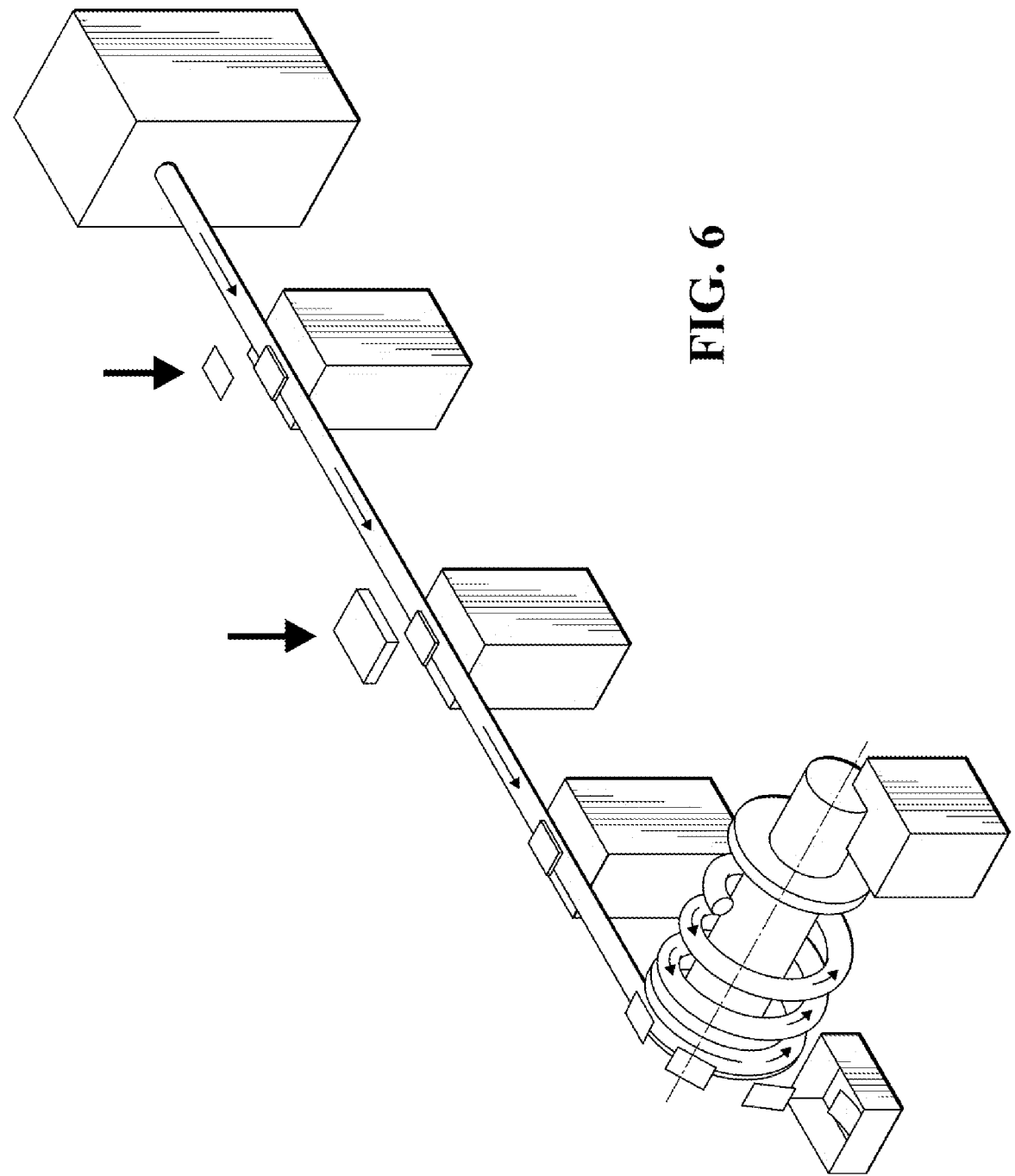
FIG. 6 is a schematic view of a representative manufacturing process used to make a finished product.

FIG. 6 illustrates one possible sequence of steps in a manufacturing process. At Station 1 (Foam Extruder), substrate material flows from machinery that is commonly used to extrude foam in different shapes. Suppliers such as BASF or Celanese provide suitable polymers and other ingredients. A preferred density for buoyancy is about $23k/m^3$. Related details of a suitable polyethylene foam extrusion process are described in "Handbook of Industrial Polyethylene and Technology: Definitive Guide to Manufacturing, Properties, Processing, Applications and Markets Set", Mark A. Spalding & Ananda Chatterjee at p. 622-23. That source is incorporated by reference.

At Station 2 (Decal Placement), indicia are placed on the substrate. Preferably, there is enough adhesive on the indicia to hold a label or decal bearing the indicia in place on the moving substrate. Cosmetic-safe adhesives include Temporary Tattoo Glue. Such products may include acrylate copolymers, surfactants and water and may be obtained from these providers or product names: Body Glue (a water-resistant medical adhesive); Pros-Aide (an adhesive used for medical prosthetic applications), Bio-Adhesive (a natural polymeric material); and Skin Tite™ (a skin safe silicone for adherence).

Next, at Station 3 (Wetting Process), a large absorbent wet cloth or sponge is squeezed and applies water to the indicia.

Subsequently, at Station 4 (Soak Time), water is allowed sufficient time to soak into the paper backing. This loosens the backing for easy removal and disposal into a refuse container.

The combination of curvature and motion toward Station 5 (Spindle Loading), releases the soaked paper. This allows it to fall into a container for disposal. At Station 5 as the extrusion flows from the foam extruder, a spindle turns and wraps the indicia-bearing flexible substrate onto the spindle. At this point, product is ready to send to customers or suppliers and can be cut to size.

Alternative indicia materials considered included latex and acrylic paints, and oil-based paints. But these materials wiped, peeled and flaked off from a polyethylene foam substrate quite readily, producing unsatisfactory results.

While exemplary variations are described above, it is not intended that these Variations describe all possible forms of the invention. Rather, the words used in the specification are words of description rather than limitation, and it is understood that various changes may be made without departing from the spirit and scope of the invention. Additionally, the features of various implementing Variations may be combined to form further Variations of the invention.

What is claimed is:

1. A method for adhering a label, lettering, ink, a tattoo, sketch, design or color ("indicia") to a substrate, the method comprising:
   providing an indicia-bearing backing paper;
   moistening the indicia-bearing backing paper to form a moistened indicia-bearing layer;
   providing an adhesive layer between the moistened indicia-bearing layer and the substrate;
   placing the moistened indicia-bearing layer on the adhesive layer;
   allowing the indicia to become separated from the backing paper, leaving the indicia upon the substrate; and
   drying the substrate.

2. The method of claim 1, further comprising the step of: separating the backing paper from the indicia.

3. The method of claim 1 wherein the substrate includes a polyethylene foam.

4. The method of claim 3 wherein the polyethylene foam embodies a swimming pool foam noodle.

5. The method of claim 4 wherein the substrate is flexible and elongated and has ends, the ends being bent backwards so that the ends are juxtaposed.

6. The method of claim 1 wherein the adhesive layer is activated so that it sticks to the substrate after the moistening step, the moistening step releasing the backing paper and leaving the ink and adhesive on the substrate.

7. The method of claim 1 wherein the indicia have a coefficient of expansion or contraction that is compatible with that of the substrate so that expansion or contraction of the substrate will not wrinkle or otherwise cause the indicia to separate.

8. The method of claim 1 wherein the indicia layer is stretched before applying it to the substrate, thereby minimizing creasing the indicia, while improving adhesion and peel-resistance between the indicia and the substrate.

9. The method of claim 1 wherein the substrate is sausage-shaped and includes a longitudinally extending filament or string that runs axially therethrough, portions of that filament extending from the substrate ends for tethering to a connector which secures a mobile phone.

10. The method of claim 1 wherein a combination of indicia and substrate have compatible moduli of elasticity and flexibility such that the indicia are not separated from the substrate by handling and bending of the substrate.

11. A method of adhering a label, lettering, ink, a tattoo, sketch, design or color ("indicia") to a substrate, the method comprising the steps of:
   applying a layer of ink to a plastic film that is supported by a backing paper to form an indicia-bearing film;
   applying water to the indicia-bearing film to form a moistened indicia-bearing layer;
   providing an adhesive layer between the moistened indicia-bearing layer and the substrate;
   placing the indicia-bearing layer on the adhesive layer and the substrate using a moisture bearing medium;
   separating the indicia from the film to create an indicia-bearing substrate; and
   drying the indicia-bearing substrate.

12. The method of claim 11 wherein the substrate includes as polyethylene foam.

13. The method of claim 12 wherein the polyethylene foam embodies a swimming pool foam noodle.

14. The method of claim 13 wherein the substrate is flexible and elongated and has ends, the ends being bent backwards so that the ends are juxtaposed.

15. The method of claim 11 wherein the indicia have a coefficient of expansion or contraction that is compatible with that of the substrate so that expansion or contraction of the substrate will not wrinkle or otherwise cause the indicia to separate.

16. The method of claim 11 wherein the indicia layer is stretched before applying it to the substrate, thereby minimizing creasing the indicia, while improving adhesion and peel-resistance between the indicia and the substrate.

17. The method of claim 11 wherein the substrate is sausage-shaped and includes a longitudinally extending filament or string that runs axially therethrough, portions of that filament extending from the substrate ends for tethering to a connector which secures a mobile phone.

18. The method of claim 11 wherein a combination of indicia and substrate have compatible moduli of elasticity and flexibility such that the indicia are not separated from the substrate by handling and bending of the substrate.

* * * * *